United States Patent
Porter

[15] 3,659,518
[45] May 2, 1972

[54] HEATING APPARATUS

[72] Inventor: Ernest Henry Roberts Porter, Scottsville, Natal Province, Republic of South Africa

[73] Assignees: Ernest Henry Roberts Porter; Doris Lydia May Porter Porter, Scottsville, Pietermaritzburg, Natal Province, Republic of South Africa

[22] Filed: Jan. 13, 1970

[21] Appl. No.: 2,511

[30] Foreign Application Priority Data

Jan. 22, 1969  South Africa..........................69/0505

[52] U.S. Cl..................................................99/386, 99/391
[51] Int. Cl. .......................................................A47j 37/08
[58] Field of Search...................99/386, 387, 389, 398, 443, 99/327; 211/90, 106, 112, 119, 134, 181; 248/128–129, 130, 220.5, 235, 249

[56] References Cited

UNITED STATES PATENTS

| | | | |
|---|---|---|---|
| 976,364 | 11/1910 | Hoffman | 99/398 UX |
| 1,697,914 | 1/1929 | Hummel et al. | 99/327 |
| 2,038,028 | 4/1936 | De Mattels | 99/386 |
| 2,182,229 | 12/1939 | Hamel | 99/386 |
| 2,714,348 | 8/1955 | Fokakis | 99/387 |
| 2,928,524 | 3/1960 | Jensen | 99/386 UX |
| 2,948,404 | 8/1960 | Harrod | 211/106 X |

FOREIGN PATENTS OR APPLICATIONS

94,648  10/1962  Denmark..................................99/386

*Primary Examiner*—Walter A. Scheel
*Assistant Examiner*—Arthur O. Henderson
*Attorney*—Karl W. Flocks

[57] ABSTRACT

This invention relates to a heating apparatus for the heat-treatment of individual items, particularly for toasting slices of bread, cooking portions of meat such as chicken, hamburger, steak and sausages, and for curing individual items. The apparatus comprises a pair of spaced-apart elongated sources of heat energy, displacement means adapted to be displaced past the sources of heat energy and maintaining means provided on the displacement means for mounting a plurality of individual items.

2 Claims, 9 Drawing Figures

Patented May 2, 1972

INVENTOR
ERNEST HENRY ROBERTS PORTER
BY KARL W FLOCKS
ATTORNEY

HEATING APPARATUS

This invention relates to a heating apparatus. More particularly the invention concerns an apparatus suitable for the continuous heat-treating of individual items, such as for toasting slices of bread; cooking portions of meat such as chicken, hamburger, steak, saussages; curing individual articles; etc.

It is often difficult to provide large quantities of toast or other individually cooked portions within a short period of time, and it is even more difficult to provide the toast or other portions with a regular and satisfactory quality and degree of toasting or cooking.

According to the invention, there is provided a heating apparatus suitable for the continuous heat-treating of individual items, which comprises at least two spaced-apart elongated sources of heat supply defining a heating zone between them, displacement means adapted to be displaced past the sources of heat energy, and mounting means provided on the displacement means for mounting a plurality of individual items.

The displacement means may be programmed to move at a steady continuous speed, or may be programmed to be stationary for a predetermined time between two predetermined movements. The apparatus is such that the mounted items will successively be exposed to the heat from both sides during displacement of the displacement means.

The sources of heat energy may comprise electrical elements. Thus, in one form a pair of spaced elongated electrical heating elements may be provided. If desired, two or more elements may be arranged or grouped together in banks to form each source of heat energy. Thus, a set of three elongated electrical elements, arranged in vertically spaced and substantially parallel relationship, may be provided as each source of heat supply.

The elements may be of any suitable length, depending upon the degree of heating required, the temperature and spacing of the elements, and the rate of travel of the displacement means. The elements may be mounted adjustably, so as to permit adjustment of their relative position. Furthermore, the individual elements in a heating zone may be adjustable to different temperatures, so that the elements may be set to provide a heating pattern as required in each case.

Although reference is made to a source of "heat energy" and to "heating elements," it should be understood that the desired toasting, cooking or like treatment may also be brought about by means other than that specifically described, such as by way of a microwave technique, or one or more gas flames, or by means of jets of hot gas, or steam. Accordingly, the terms "heat energy," "heating elements" and similar terms should be interpreted in a corresponding manner to cover such other suitable means for achieving the same result.

Reflectors may advantageously be provided in positions adapted to reflect heat from the heating elements towards the mounting means for items to be heated. In the case of heat sources in the form of sets of elongated electrical elements, a reflector may comprise an elongated channel-shaped structure the concave side of which is of a suitable reflective material, and which is arranged on the outside of the elements relative to the items to be heated so that its concave reflective face is directed towards the items to be heated. The heat given off by the elements will accordingly be directed towards the items to be heated. The reflectors may also be mounted adjustably, if desired.

The displacement means may comprise an endless conveyor, such as a roller chain or belt or cable or the like, arranged to move over suitable sprockets, pulleys or the like. The sprockets or pulleys may in turn be mounted on a suitable frame or casing, in such a position that the conveyor will be displaced between the heating sources. The conveyor should be resistant to heat, and may for example consist of one or more endless stainless steel cables.

The mounting means for the individual items may be provided on the endless conveyor in suitably spaced relationship so as to move the items past the heating elements at the required rate.

In one form, the mounting means may be adapted for mounting slices of bread for making toast, and may comprise a plurality of spaced upright supports for supporting the end faces of the slices and arranged in longitudinally spaced relationship along the conveyor, and side supports for holding the slices upright. The supports may comprise a "front" support at the leading edge, a "rear" support at the trailing edge and the side supports. The side supports should be adapted to expose the maximum surface area of the bread slices to the heat. In one form, the side supports may comprise a pair of thin strands or wires, e.g. in the form of small diameter coiled spring elements, extending between adjacent upright supports between which the slice of bread is to be received. The upright supports may be in the form of upright plates of a width more or less the thickness of a slice of bread, and these plates may have the added function of protecting the leading and trailing edges of the slice against the heat so as to avoid excessive heating, burning or charring of the edges.

As already indicated, the side supports may extend between the forward and rear supports. Preferably the arrangement is such that the wires or strands of spring elements forming the side supports extend diagonally across the side faces of the slice, whereby an un-toasted cutting line is provided across each side face of a slice.

Thus, one preferred mounting means comprises an L-shaped member in side view of width adapted to receive a slice of bread, and a helical spring or wire extending between the two extremities of the L on either side of the slice.

In practice, the various features of the apparatus may be adjusted to give the best results; in other words, the temperature of the heating elements, the rate of travel of the conveyor, the spacing of the mounted items, the lateral spacing of the heating elements, etc. may be adjusted to provide toast having the required quality.

According to a further feature of the invention, means may be provided for directing an air current between the items being heat-treated and the sources of heat energy. This feature is of particular importance to obtain a thorough and regular toasting or cooking of the items in the shortest period of time.

Without intending to be bound by any theoretical explanation put forward, it is believed that many existing bread toasters, particularly those operating on a large scale, do not give satisfactory results because the slow heating of the bread, particularly in the case of fresh bread, induces the formation of a "curtain" of steam across the side surfaces of the slice of bread. This has the result of preventing the scorching effect of the heat to reach and evenly brown the side surfaces of the slice. The crust of the slice normally has less inherent moisture than the central portions, so that no effective steam "curtain" is formed about the crust, with the result that the crust is often burnt long before the central parts of the slice are browned.

For this reason it has been found desirable to direct an air flow between the bread and the heating elements, to remove the steam "curtain" and enable the heat to reach the entire slice evenly.

In this connection it has also been found desirable to adjust the heating elements to direct a quick heat towards the central area of the slice, and heat of a gradually decreasing temperature towards the edges of the slice. This feature will assist in providing a regular and even toasting effect.

The air flow may be obtained by way of natural heat convection, by providing a casing with suitable air inlet and outlet openings around the heating means and the displacement means. In one form, a casing may be provided around and spaced from the reflectors, with air inlet openings in the lower region thereof and outlet openings in the upper region thereof, the various openings being positioned to induce convection air flow between the items being heat-treated and the heating elements, and between the reflectors and the outer casing.

The hot air emerging from the casing may be used to heat or warm other items, or for keeping already heat-treated articles such as toast warm until it has been served. To this end, suitable warming platforms or shelves may be provided on the outside of the casing, on which the items to be warmed by the hot air, may be placed.

The displacement means and the sprockets or pulleys therefor, may be provided in a suitable housing or casing. The lowermost part of the housing or casing may conveniently be formed with a channel formation extending along the length of the apparatus, for receiving the slack part of the endless conveyer means. At one or both ends of the channel formation, discharge openings may be provided through which toasted or cooked items may be discharged. These openings may be provided with chutes or the like, leading into bins or hoppers for receiving the discharged items. Furthermore, a feed opening may be provided in the casing or housing in a suitable position, through which items to be heat-treated can be mounted in the mounting means.

The invention and the manner in which it may be carried out in practice, will now be described by way of example with reference to the accompanying drawings.

Referring to the drawings, a bread toaster according to the invention comprises a pair of spaced heating means 10, 12, each comprising three elongated electrical heating elements 10a, 10b, 10c and 12a, 12b, 12c, conveniently infra-red elements, shown in cross-section. Around the heating means 10, 12 two reflectors 14, 16 are provided, which are in the form of elongated channel-shaped structures of suitable reflective material and extending the length of the heating elements 10, 12.

Figure 2:
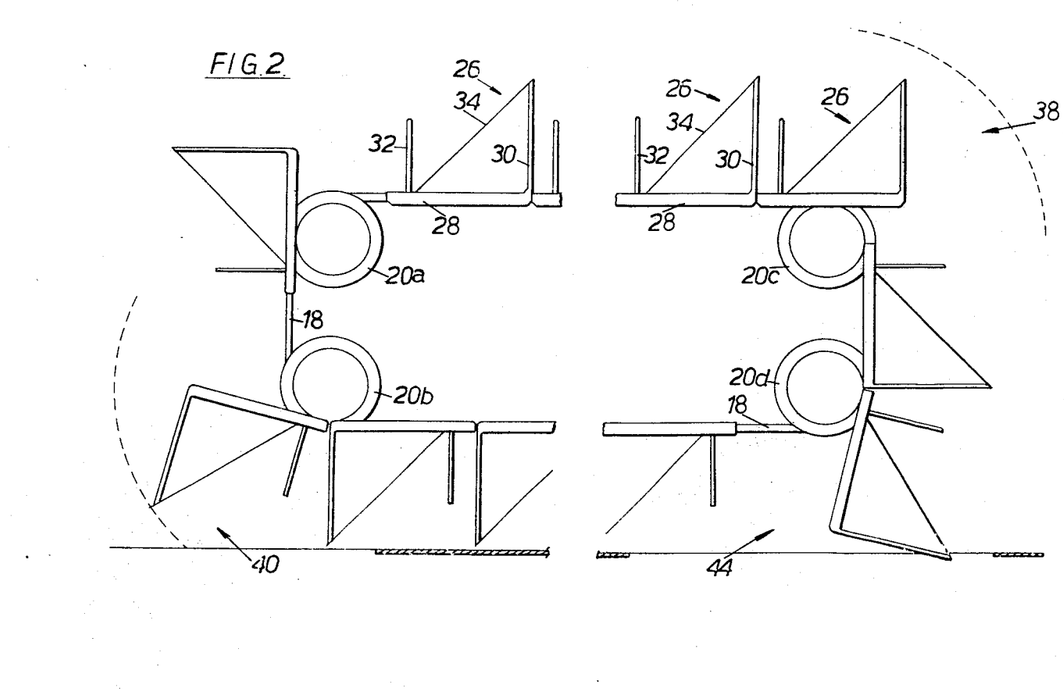
FIG. 2 is a diagrammatic side elevation of one form of conveyer means for the bread toaster.
Figure 3:
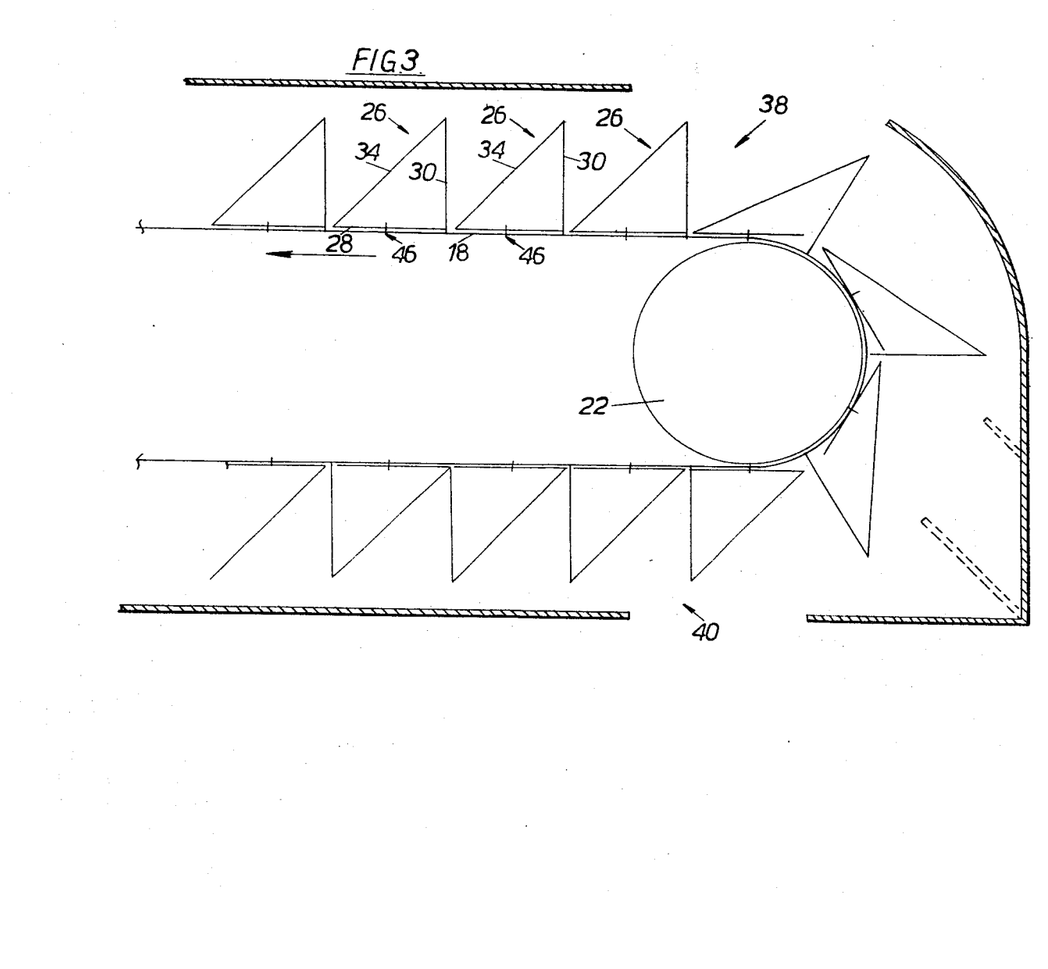
FIG. 3 is a diagrammatic side elevation of a part of another form of conveyer means.

Between the heating means 10, 12 an endless conveyor 18, in the form of a chain or a stainless steel strip or wire cable or the like, is arranged. As shown in FIGS. 2 and 3 the conveyer 18 is arranged to be displaced over sprockets 20a, 20b, 20c, 20d in the case of a chain conveyer (FIG. 2), or over pulleys 22 in the case of a stainless steel band or cable conveyer (FIG. 3). The conveyer 18 may be arranged to run in a suitable grease way 24.

On the conveyer 18, mounting means (generally indicated as 26 in FIGS. 1, 2 and 3) are provided for mounting the slices of bread to be toasted. The mounting means are in the form of a plurality of toaster frames mounted on the conveyer 18 the one behind the other along its length (see FIGS. 2 and 3), each toaster frame being adapted to receive a slice of bread in such an upright position that the side faces of the slice will be exposed to the heating means 10, 12 on either side as the slices are conveyed between the heating means.

Figure 4A:
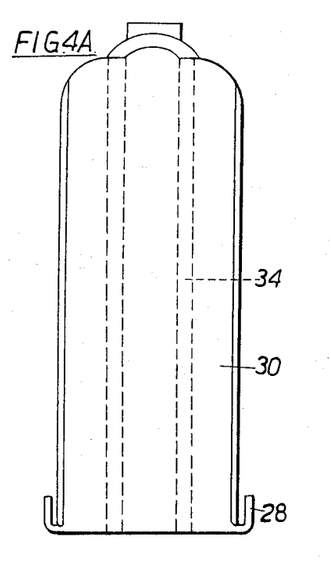
FIGS. 4A and 4B are front and rear elevations respectively of one form of mounting means for the slices of bread to be toasted.
Figure 4B:
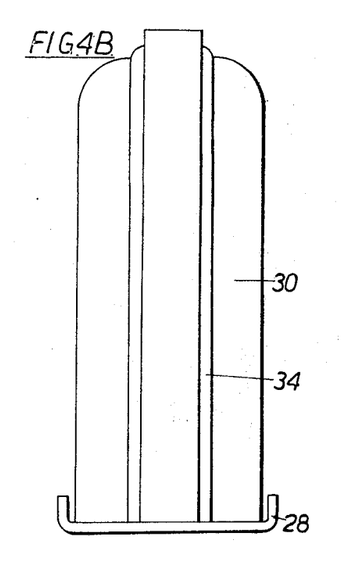
Figure 5:
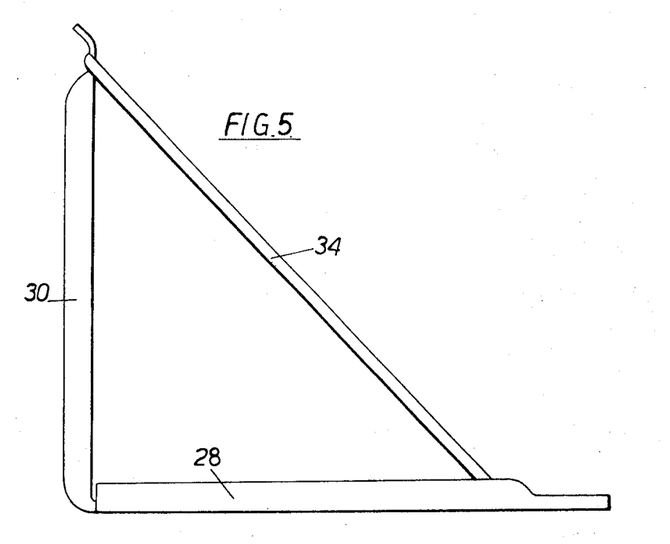
FIG. 5 is a side elevation of the mounting means.
Figure 6:
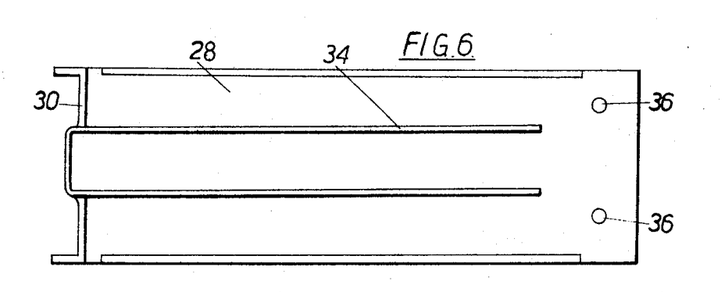
FIG. 6 is a top plan view of the mounting means.

The conveyer with the mounting means is further illustrated in FIGS. 2 to 6. Referring to FIGS. 4 to 6, each toaster frame 26 comprises a base part 28, an upright rear support plate 30, and side supports 34. The rear support plate 30 is of such a width that it will protect the trailing upright crust edge of the slice, and also the leading upright crust of the following slice, against burning. In practice, the rear support plate of one toaster frame thus serves simultaneously as the front support plate of a succeeding toaster frame, so that the toast will be adequately supported by a plurality of similar toaster frames provided along the length of the conveyer in closely adjacent relationship. The side supports 34 comprise thin helical springs or thin steel wires, and extend diagonally between the base part 28 and the rear support plate 30. When the slices are toasted, each slice will have a diagonal cutting line extending across both faces and caused by the presence of the side supports 34.

The toaster frames preferably are such that if the movement of any frame becomes hindered (e.g. through a person's finger, a knife or food becoming stuck, the side supports are released, and it can bend out of the way and not damage the remainder of the apparatus.

Referring now to FIG. 2, the toaster frames 26 (which may be constructed as described above or which may be of any other suitable construction), may be mounted on a conveyor in the form of a roller chain 18 drawn over sprockets 20a, 20b, 20c, 20d. Each toaster frame 26 may be secured to the chain near its forward end by means of two bolts, rivets or clips as at 36 (see also FIG. 6). Slices of bread to be toasted are fed into the toaster frames 26 by hand at a point 38; the slices are conveyed between the heating elements 10, 12; and when the chain 18 is drawn over the sprockets 20a, 20b the toaster frames 26 are slowly tilted to discharge the toasted slices at a point 40, the upright support plates 30 preventing premature discharge of the slices but permitting crumbs to fall out of the toaster frames 26. The toaster frames 26 are then displaced in a channel formation 42 which will be described in more detail later on. Any slices still remaining in the toaster frames 26 are discharged at a second discharge point 44.

An alternative embodiment of the toaster frames 26 and conveyer 18 is shown in FIG. 3. In this case, the conveyer 18 is in the form of an endless stainless steel wire or cable strip displaced over two pulleys one of which is shown as 22 in FIG. 3. On the strip 18 the toaster frames 26 are mounted, e.g. by bolts or clips at an intermediate point 46, and it will be noted that there are again no separate front and rear supports, but merely a single support 30 serving as the rear support in respect of one toaster frame 26 and the front support of the succeeding toaster frame. Further, the supports 30 are not fixed to the base part 28. Slices of bread to be toasted are fed and discharged in a similar manner as shown in FIG. 2. It will be noted further that as the toaster frames 26 are drawn over the circumference of the pulley 22, the front and rear supports 30 will be displaced slightly outwardly, to open the toaster frame for discharging the slice of toast. At the same time the base parts 28 will be raised slightly, to assist with the discharge.

Suitable discharge chutes, bins, or the like (not shown) may be provided at the discharge points 40, 44.

The sprockets 20 or pulleys 22 are mounted on a suitable support 48.

Figure 1:
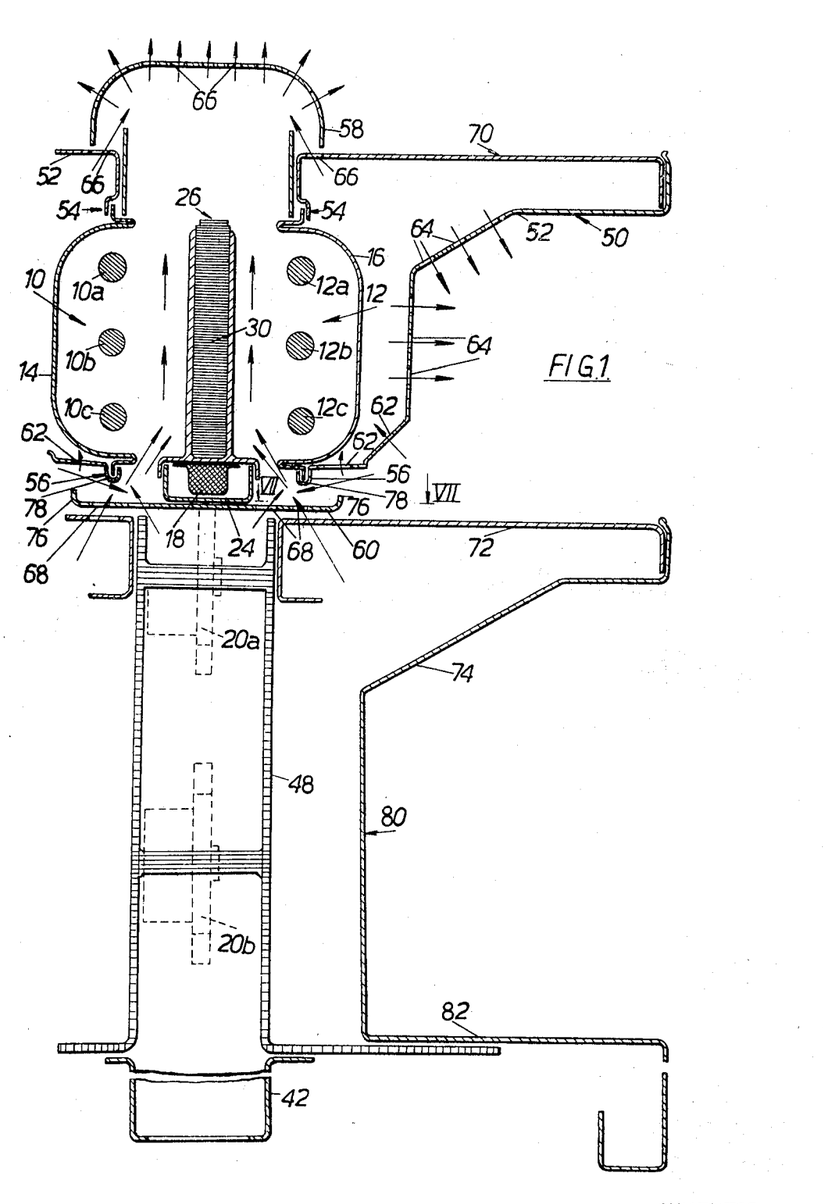
FIG. 1 is a cross-sectional view of a heating apparatus according to the invention, in the form of a bread toaster, with parts broken away.

The various components of the apparatus are encased in a suitable casing. Thus the heating part including the heating elements, reflectors and the upper path of the conveyer, is enclosed in a casing 50 comprised of a pair of longitudinally extending and laterally projecting casing parts 52 which may be secured to or engaged with the reflectors 14, 16 in any suitable manner, as at 54, 56. In FIG. 1 only the right-hand half of the casing 50 is shown in full; the other half is of substantially the same construction. A top cover 58 extends along the top of the apparatus. A shutter plate 60 extends underneath the heating portion between the heating portion and the driving portion described in more detail below.

The casing parts 52 have openings 62 in their lower regions; and further openings 64 higher up. Furthermore the top cover has openings 66; and the shutter plate 60 has openings 68. The purpose of the openings is to serve as inlets (62, 68) and outlets (64, 66) to permit an airflow to take place from below into the heatingportion and particularly between the heating elements 10, 12 and the bread being toasted in the toaster frames 26, in the direction of the arrows. This air flow has the effect of disturbing and removing a "curtain" of steam which may form between the bread being toasted and the heating elements, which "curtain" would normally have the effect of blanketing the heating effect of the heating elements, and so retarding the toasting process. Furthermore, the hot air emerging from the outlets 64 serves to warm the shelf areas 72 defined by the casing parts 74, while the shelf areas 70 are warmed by the heat radiation from the reflectors 14, 16. These shelves may then be used for packing already toasted bread to be kept warm. Finally, the air flow will prevent localized overheating in the apparatus.

Figure 7:
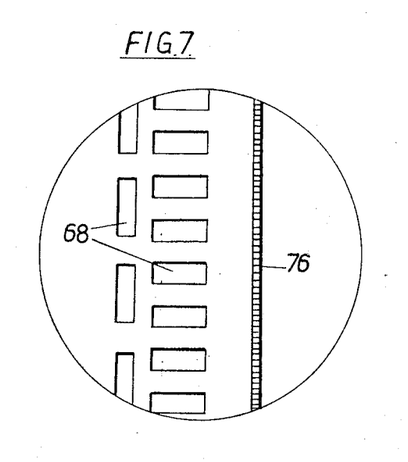
FIG. 7 is a fragmentary sectional view along line VII—VII in FIG. 1, on an enlarged scale.

The configuration of the openings in the shutter plate 60 is shown in FIG. 7.

The casing parts 52 together with the reflectors 14, 16 and heating elements 10, 12 can be adjusted horizontally, by displacing the two half parts away from and towards one another. In this manner, the heating elements 10, 12 can be moved away from or nearer to the bread to be toasted, to vary the toasting effect. The flanges 76 on the shutter plate 60 act as stop means to limit the outward horizontal displacement, together with the flanges 78 on the casing parts 52.

Furthermore, the heating portion including the casing parts 52, reflectors 14, 16 and heating elements 10, 12 may be adapted for adjustment in a vertical direction, by being displaceable away from and towards the shutter plate 60. Such adjustment would also vary the toasting effect.

It will be appreciated that horizontal and vertical adjustment of the heating portion will have the effect of varying the flow of air, by varying the relative positioning of the inlets 62, 68.

The driving part of the apparatus, including the sprockets 20 or pulleys 22 and their mounting 48, is also enclosed in a casing 80, having casing parts 74 defining shelf areas 72 and base parts 82. As already indicated, a channel formation 42 extends underneath the apparatus between the base parts 82, for the purpose of receiving and retaining the slack portion of the conveyer 18 and toaster frame 26 during the displacement of the conveyer. The channel formation 42 will enable the slack part of the conveyer to sag below the base of the apparatus by virtue of its own weight and that of the toaster frames, and so will prevent dragging and fouling of the toaster frames and consequent damage. Suitable openings are provided in the channel formation at the discharge points 40, 44.

With the toasting of bread, particularly fresh bread, it has been found that the temperature of the centre elements should preferably be kept very low, and that of the lower elements should preferably be high. In each case, however, the temperature of the various heating elements and the other settings of the apparatus will depend upon the conditions of that particular case; for example, when the bread is very fresh and thus has a greater degree of moisture, different temperature and other conditions would be required as compared to bread with less moisture.

Any suitable drive means may be provided for the conveyer 18. Thus, a pulley may be provided on one of the drive shafts, and this may be driven from a driven pulley by means of a slack belt. This slack drive belt will act in the manner of a slipping clutch, and thus provide a safety measure.

Figure 8:
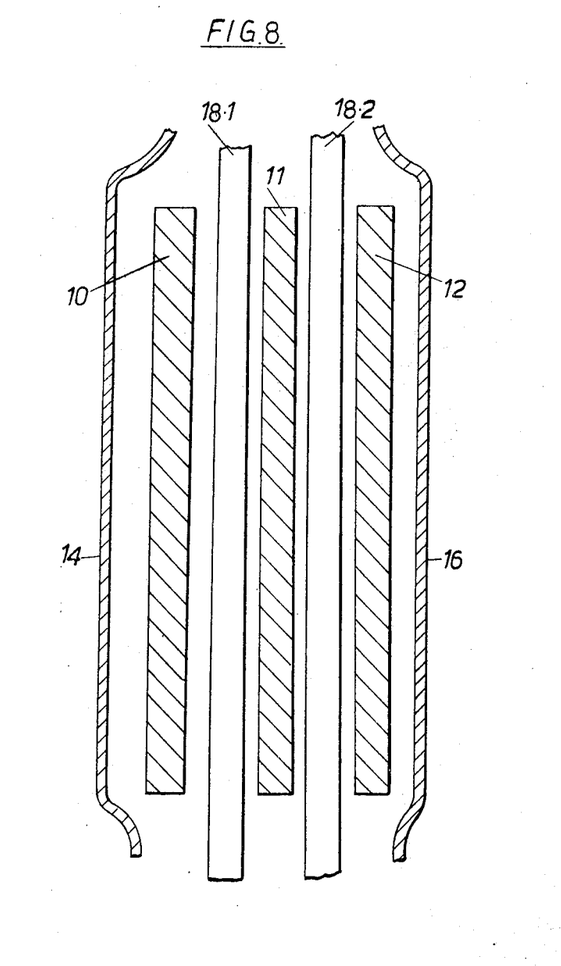
FIG. 8 shows a modification of part of the embodiment of FIG. 1.

Referring now to FIG. 8, this shows a diagrammatic cross section of another embodiment of the invention, the section being taken across a position equivalent to VIII—VIII of FIG. 1 but with the toaster frames omitted for simplicity.

In the modification shown in FIG. 8, which is not to scale, a further heating means 11 is situated parallel to and between the spaced heating means 10, 12. The conveyer 18 of FIG. 1 is replaced by two separate conveyors, 18.1, 18.2, one being adapted to convey mounting means (not shown) for bread or the like between heating means 10 and the further heating means 11, and the other being adapted to convey mounting means (not shown) for bread or the like between the further heating means 11 and heating means 12. The distance apart of reflectors 14 and 16 is increased accordingly.

The length of the heating means will depend on the intended use, but we have found that the provision of six mounting means between the heating means at any one time to be particularly suitable. With such apparatus, and depending on the conveyor speed, 300 or more pieces of toast per hour can be made. Alternatively, a sausage can be grilled in about 9 seconds.

Idler pulleys, or the like, can be used to keep the conveyer(s) under tension. The conveyer(s) may be driven by a motor either running at a fixed speed, or a motor including a stationary phase while food is between the heating means.

If the motor includes a stationary phase, the mounting means can be so positioned that while one group of say 6 is in stationary position between the heating means, another group is in position to be loaded with items to be heated.

A single switch can be provided for the apparatus and a timed automatic switch off period may also be provided for. The timing may be adjustable

I claim:

1. A heating apparatus for the continuous heat-treating of individual items, which comprises a framework, a central elongated source of heat energy mounted on said framework, a further pair of elongated sources of heat energy mounted on the framework, the further pair of sources of heat energy being arranged one on either side of said first source of heat energy and being substantially parallel thereto but spaced apart therefrom, a first moveable displacement means supported on said framework and adapted to be displaced past and between one spaced-apart pair of elongated sources of heat energy, a second moveable displacement means supported on said framework and adapted to be displaced past and between the other spaced-apart pair of sources of heat energy, driving means for causing the displacement means to be displaced past the elongated sources of heat energy, mounting means situated on said displacement means and adapted to receive a plurality of individual items to be heated, and means for enabling a current of air to be directed upwardly between adjacent sources of heat energy, said mounting means comprising a plurality of upright supports on bases attached to the displacement means to define a plurality of L-shaped members in side view, adjacent L-shaped members being so spaced apart as to be adapted to receive the end faces of a slice of bread between them, and a wire extending between the two extremities of each L-shaped member on the sides adjacent to both heating means to define diagonal side supports for said slice of bread.

2. A heating apparatus according to claim 1, wherein means for enabling a current of air to be directed upwardly between adjacent sources of heat energy comprises a casing attached to said framework and spaced from the sources of heat energy, air inlet openings in a lower region of said casing and air outlet openings in an upper region of said casing.

* * * * *

UNITED STATES PATENT OFFICE
CERTIFICATE OF CORRECTION

Patent No. 3,659,518            Dated May 2, 1972

Inventor(s) Ernest Henry Roberts Porter

It is certified that error appears in the above-identified patent and that said Letters Patent are hereby corrected as shown below:

Column 1, lines 4 and 5 should read:

[73] Assignees: Ernest Henry Roberts Porter; Doris Lydia

May Porter

Signed and sealed this 9th day of January 1973.

(SEAL)
Attest:

EDWARD M. FLETCHER, JR.            ROBERT GOTTSCHALK
Attesting Officer                   Commissioner of Patents